(12) United States Patent
Parmentier et al.

(10) Patent No.: US 8,387,368 B2
(45) Date of Patent: Mar. 5, 2013

(54) METHOD FOR CONTROLLING A SCR CATALYST

(75) Inventors: Michael Parmentier, Chatillon (BE); Julien Schmitt, Kuntzig (FR)

(73) Assignee: Delphi Technologies Holding S.arl, Troy, MI (US)

( * ) Notice: Subject to any disclaimer, the term of this patent is extended or adjusted under 35 U.S.C. 154(b) by 559 days.

(21) Appl. No.: 12/607,431

(22) Filed: Oct. 28, 2009

(65) Prior Publication Data
US 2010/0107609 A1    May 6, 2010

(30) Foreign Application Priority Data
Oct. 30, 2008   (EP) ..................... 08167975

(51) Int. Cl.
*F01N 3/00* (2006.01)
*F01N 3/10* (2006.01)
(52) U.S. Cl. ............... 60/286; 60/276; 60/295; 60/301
(58) Field of Classification Search .......... 60/274, 60/276, 286, 295, 301
See application file for complete search history.

(56) References Cited

U.S. PATENT DOCUMENTS

| | | |
|---|---|---|
| 2006/0000202 A1 | 1/2006 | Ripper et al. |
| 2006/0010857 A1* | 1/2006 | Hu et al. ................ 60/286 |
| 2007/0125071 A1 | 6/2007 | Westerberg |
| 2008/0010974 A1* | 1/2008 | Frazier et al. ........... 60/277 |
| 2008/0250774 A1* | 10/2008 | Solbrig ................... 60/295 |
| 2009/0272105 A1* | 11/2009 | Chi et al. ................ 60/295 |

OTHER PUBLICATIONS

European Search Report dated Jun. 8, 2009.

* cited by examiner

*Primary Examiner* — Kenneth Bomberg
*Assistant Examiner* — Audrey K Bradley
(74) *Attorney, Agent, or Firm* — Mark H. Svoboda

(57) ABSTRACT

A method for controlling a selective catalytic reduction catalyst in an exhaust line of an internal combustion engine is disclosed, wherein the supply of a quantity of a gaseous ammonia reductant to the SCR catalyst uses a closed-loop SCR catalyst model coupled to a SCR-out NOx sensor that measures a SCR-out NOx emission value. The closed-loop SCR catalyst model uses a relationship linking the measured SCR-out NOx value to the NOx conversion efficiency and the ammonia slip. The actual $NH_3$ emission value and/or an actual SCR-out NOx indicative value are computed based upon differentiation of said relationship.

15 Claims, 1 Drawing Sheet

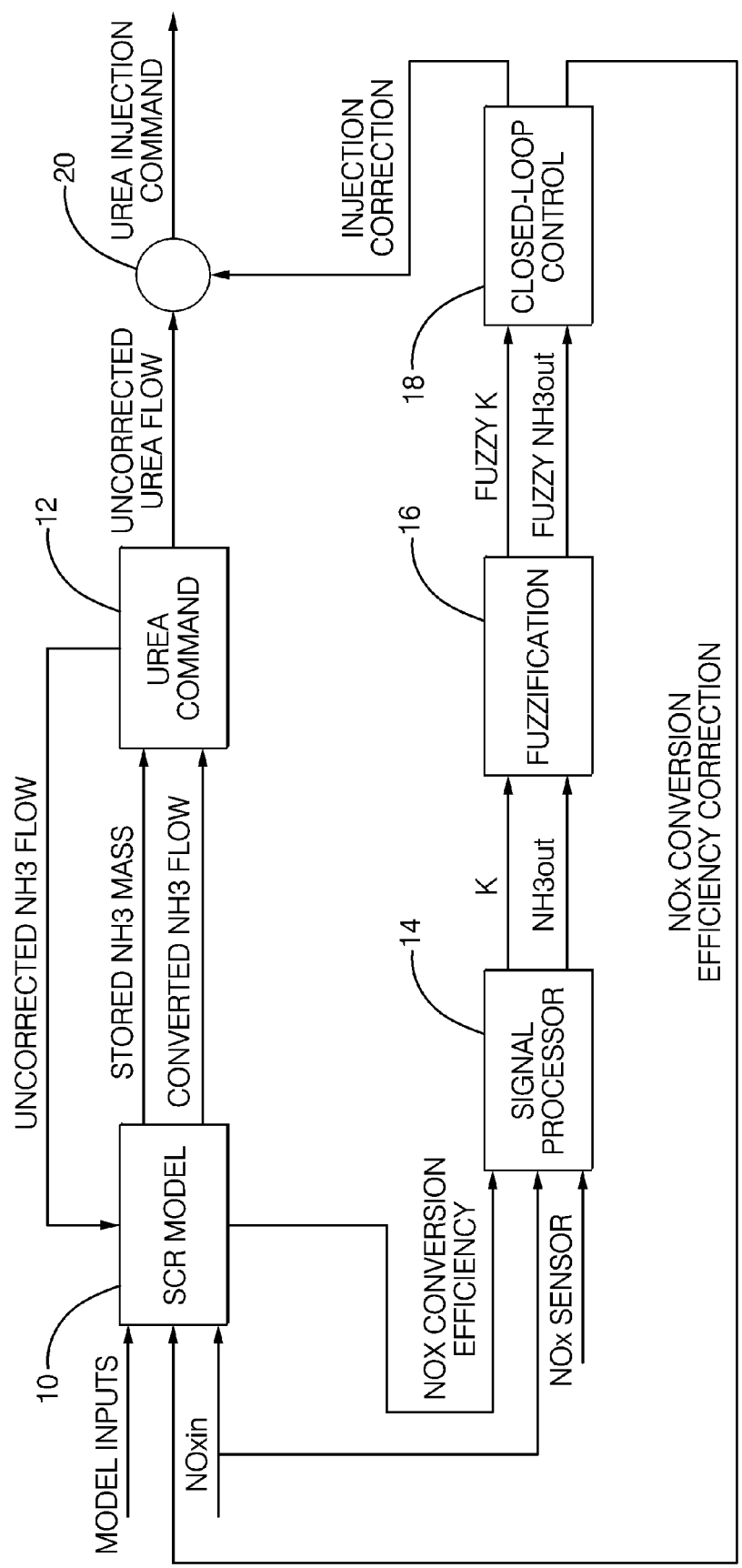

METHOD FOR CONTROLLING A SCR CATALYST

FIELD OF THE INVENTION

The present invention generally relates to Selective Catalytic Reduction (SCR) catalysts and particularly, but not exclusively, to the determination of SCR catalyst parameters and control thereof in vehicle engines.

BACKGROUND OF THE INVENTION

SCR catalysts remove nitrogen oxides (NOx), often the most abundant and polluting component in exhaust gases, through a chemical reaction between the exhaust gases, a reducing agent, and a catalyst Urea-based SCR catalysts use gaseous ammonia as the active NOx reducing agent. Typically, an aqueous solution of urea, also known as carbamide (($NH_2$)$_2$CO), is carried on board of a vehicle, and an injection system is used to supply it into the exhaust gas stream entering the SCR catalyst where it decomposes into gaseous ammonia ($NH_3$) and is stored in the catalyst. The NOx contained in the engine exhaust gas entering the catalyst then reacts with the stored ammonia, which produces nitrogen and water. The amount of urea (reductant precursor) injected is controlled to provide the maximum NOx conversion efficiency whilst keeping excess $NH_3$, also known as $NH_3$ slip, to low values.

SCR catalysts have mainly been introduced on heavy-duty vehicles where high NOx levels are present and where steady state can be considered to be the main operating conditions. In these conditions, SCR control consists of supplying a certain $NH_3$ to NOx ratio, usually mapped as a function of speed and load.

Applying this kind of control on a passenger car, where transient conditions are more frequent, usually requires specific transient corrections. Moreover, vanadium based catalysts are often used on heavy duty vehicles and this technology is known to have a reduced buffering effect (the temporary storage of $NH_3$) than new Zeolite based catalysts (Fe, Cu) used on passenger car (or light duty) applications. In this connection, it is now known that the NOx conversion efficiency depends on the amount of ammonia stored therein, while it is not necessary that all of the catalyst storage capacity be utilized by ammonia to achieve the optimal NOx conversion efficiency. Additionally, the NOx conversion efficiency also depends on the catalyst temperature.

As a result, SCR control generally involves:
- an open-loop dosing of reducing agent based on maps or based on chemical modelling of the SCR system;
- closed-loop correction of the dosing with a post-SCR exhaust sensor, typically a NOx sensor.

A difficulty of closed-loop control of such a system is that NOx sensors are sensitive to $NH_3$. In practice, this implies that when excess urea is injected and converted to $NH_3$, the post-SCR NOx sensor detects the $NH_3$ breakthrough (slip) as an increase in NOx, which is thus interpreted by conventional controllers as a need to increase the reducing agent dosing, while the urea injection should actually be reduced.

This cross-sensitivity to $NH_3$ thus creates additional difficulty that is required to be taken into account in the control of SCR catalyst systems in order to avoid wrong dosing actions.

Hence, there is a need for an improved method for the closed-loop control of a SCR catalyst. This is achieved by a method for controlling a SCR catalyst as claimed in claim 1.

SUMMARY OF THE INVENTION

The present invention relates to a method for controlling a selective catalytic reduction (SCR) catalyst in an exhaust line of an internal combustion engine, wherein the supply of a quantity of a gaseous ammonia ($NH_3$) reductant to the SCR catalyst uses a closed-loop SCR catalyst model coupled to a SCR-out NOx sensor that measures the NOx level in the exhaust gas exiting the SCR catalyst: the SCR-out NOx emission value. The SCR catalyst model includes a NOx conversion efficiency model. As it is known in the art, such NOx conversion efficiency represents the conversion ratio of NOx in the SCR catalyst, and may depend on the quantity of $NH_3$ reductant stored in the SCR catalyst and on the temperature of the latter.

It shall be appreciated that in order to provide for an improved closed-loop control, the present invention proposes a more accurate way of determining the NOx and $NH_3$ emissions at the catalyst's exit, and this from the measurement delivered by the SCR-out NOx sensor.

According to an important aspect of the invention, the closed-loop SCR catalyst model uses a relationship linking the measured SCR-out NOx value (i.e. according to the NOx sensor reading) to the NOx conversion efficiency and the ammonia slip, wherein an actual $NH_3$ emission value and/or an actual SCR-out NOx indicative value are computed based upon differentiation of said relationship, with the hypothesis that a drift in the NOx conversion efficiency model and a variation of ammonia slip occurs on a longer time scale than the variation of nitrous oxides entering and exiting the SCR catalyst.

In other words, based on the hypothesis that the measured SCR-out NOx value comprises two components, the method according to the present invention processes said relationship with SCR-in and -out NOx values to determine each component. A particular merit of the present inventors is however to have observed that for the SCR catalyst modelling, a drift in the NOx conversion efficiency model (i.e. the variation between the model and actual NOx conversion efficiencies) and a variation in the $NH_3$ slip occur on a longer time scale than the amounts of NOx entering and exiting the SCR catalyst. And it is this assumption that permits extracting the actual $NH_3$ emission value and/or actual NOx indicative value from said relationship, based upon differentiation.

It shall be noted that the actual NOx indicative value may be expressed as a NOx emission value or a NOx conversion efficiency or a modelling error of the NOx conversion efficiency, which in the three cases is representative of the performance of the SCR catalyst and can be used further in the SCR control, as well as the actual $NH_3$ emission value that corresponds to the $NH_3$ slip.

Preferably, the relationship comprises a modelling error factor representative of the drift of the NOx conversion efficiency model.

In a preferred embodiment, the following relationship is used:

$$NOx_m = NOx_{in} \cdot (1 - K \cdot \eta) + NH_3^{out}, \text{ where}$$

$NOx_m$ represents the measured SCR-out NOx value, i.e. the NOx sensor reading;

$NOx_{in}$ represents a determined NOx value entering the catalyst;

$\eta$ represents the predetermined, model NOx conversion efficiency;

K represents the modelling error factor on the NOx conversion efficiency model; and $NH_3^{out}$ represents the $NH_3$ emission value at the exit of the SCR catalyst, i.e. $NH_3$ slip.

According to the present invention, the K and $NH_3^{out}$ components can be found based upon differentiation, with the hypothesis that K and $NH_3^{out}$ vary over a longer time scale than the other components $NOx_m$, $NOx_{in}$ and η.

It may be noted that the $NOx_{in}$ value can be determined either by measurement upstream of the SCR catalyst or by modelling, based on various engine parameters such as e.g. injected fuel flow, engine load, EGR rate, ambient temperature.

According to another aspect of the present invention, there is proposed a method for controlling a selective catalytic reduction (SCR) catalyst using a SCR catalyst model for driving the supply of reductant, wherein the SCR catalyst model has as inputs: the engine-out nitrous oxides (NOx) value, the SCR catalyst temperature and the stored reductant value in the SCR catalyst; the method further using a NOx conversion efficiency model. According to an important aspect of this SCR control method, a modification of the supply in reductant depends on both an actual reductant slip value and an actual drift of the NOx conversion efficiency model.

It will be understood that when more precise emission values of NOx and reductant emissions can be determined, for example by the above method, another issue is their proper use in the SCR catalyst control scheme. While prior art closed-loop control method are traditionally based on complex control measures to assess whether a reductant supply corrective action is valid or not, due to the cross sensitivity of the $NO_X$ sensor, in the present method a correction of the supply of reductant depends on a pair of parameters, namely: the actual reductant slip at the SCR catalyst exit and an actual drift of the NOx conversion efficiency model (i.e. these values of reductant slip and drift are actual in that they result from measurement).

This drift of the NOx conversion efficiency model may be represented by a modelling error factor, or can be assessed by a comparison between an actual NOx conversion efficiency (i.e. measured) and a predetermined NOx conversion efficiency (i.e. according to the model).

Preferably, a modification of the reductant is carried out as follows:
   the reductant supply is increased when the reductant slip value is below a slip threshold and the actual NOx conversion efficiency lower than the predetermined NOx conversion efficiency; and
   the reductant supply is reduced when the reductant slip value is equal or greater than the slip threshold and the actual NOx conversion efficiency is equal or higher than the predetermined NOx conversion efficiency.

It may be noted that in practice the modification of the reductant supply is carried out by modifying the injection of reductant precursor such as urea in case $NH_3$ is the active reductant.

Additionally, to take into account a possible drift in the NOx conversion efficiency model, due to e.g. catalyst ageing, the efficiency model is preferably modified as follows:
   the NOx conversion efficiency model is globally reduced when the reductant slip value is equal or greater than the slip threshold and the actual NOx conversion efficiency is lower than the predetermined NOx conversion efficiency; and
   the NOx conversion efficiency model is globally increased when the reductant slip value is lower than the slip threshold and the actual NOx conversion efficiency is greater than the predetermined NOx conversion efficiency.

As it will be understood, when the reductant is $NH_3$, the actual $NH_3$ slip values and actual NOx conversion efficiency values to be used in this control strategy can advantageously be determined by means of a post-SCR NOx sensor in accordance with the above described method.

BRIEF DESCRIPTION OF THE DRAWING

The present invention will now be described, by way of example, with reference to the accompanying drawing, in which the single FIGURE is a principle diagram of a preferred embodiment of SCR catalyst control scheme in accordance with the present invention.

DETAILED DESCRIPTION OF THE INVENTION

As it has been explained, the control of SCR catalysts involves driving the supply of reducing agent in such a way as to provide the maximum NOx conversion efficiency whilst keeping $NH_3$ slip to a minimum. Although complex models have been developed, only a measurement of the actual NOx emission at the SCR exit permits validating the control strategy. In this connection, the NOx sensors technology suffers from cross-sensitivity to $NH_3$, i.e. the measured NOx values are distorted in presence of $NH_3$.

But the present method proposes a way of exploiting the measurement of such NOx sensors for closed-loop operation, and specifically processes the NOx sensor signal to extract therefrom the "real" NOx component and the "real" $NH_3$ component. The process relies on several observations and assumptions.

SCR catalysts used on passenger cars are usually based on Cu or Fe zeolites, which exhibit a significant $NH_3$ storing capacity. This capacity acts as a buffer for NOx conversion and $NH_3$ slip.

In the present method, processing of the NOx sensor signal employs existing features of the embedded control strategy, such as the SCR catalyst model and the NOx conversion efficiency model. Such models are know in the art; a particularly preferred SCR catalyst model and NOx conversion efficiency model are described in European patent application no. 07 253 090.0, which is incorporated herein by reference.

The principle of these virtual sensors is that neither a drift in the NOx conversion efficiency model, preferably expressed as NOx conversion efficiency modeling error (real efficiency/modeled efficiency), nor the $NH_3$ slip can change instantaneously. Accordingly, for optimal performance the SCR catalyst should advantageously be accurate enough on a nominal SCR system (i.e. take into account as many effects as possible on conversion efficiency, also during transients) so that the modeling error can not change instantaneously. Additionally, due to the buffering effect of the zeolites, $NH_3$ slip cannot occur instantaneously.

However, if the NOx efficiency modeling error cannot change instantaneously, the post-SCR NOx concentration can directly be linked to the pre-SCR NOx concentration:

$$NOx_{out\_real} = NOx_{in\_real}(1-\eta_{real}) \qquad [1]$$

where $NOx_{out\_real}$ is the real NOx component in the measured NOx signal; $NOx_{in\_real}$ is the NOx concentration in the engine exhaust gas entering the SCR catalyst and $\eta_{real}$ is the real NOx conversion efficiency.

For typical driving condition temperatures, $NH_3$ slip occurs when the amount of stored $NH_3$ in the SCR is high. This means that the $NH_3$ slip concentration is (almost) independent of the pre-SCR NOx concentration.

By comparing the post-SCR and pre-SCR NOx for several values over a short time scale, it becomes possible to separate the real NOx signal component and the real NH$_3$ signal component. This is can be done based on the following relationship:

$$NOx_m = NOx_{in} \cdot (1 - K \cdot \eta) + NH_3^{out} \quad [2]$$

Where $NOx_m$ represents the measured SCR-out NOx value;

$NOx_{in}$ represents a determined NOx value entering the catalyst;

$\eta$ represents the predetermined NOx conversion efficiency;

K represents the error on the NOx conversion efficiency model; and $NH_3^{out}$ represents the NH$_3$ emission value at the exit of the SCR catalyst.

Based, as explained above, on the hypothesis that K and $NH_3^{out}$ vary on a longer time scale than the other variables, these terms can be calculated based upon differentiation of equation [2]. This gives, for two sets of points:

$$K = \frac{(NOx_{in} - NOx'_{in}) - (NOx_m - NOx'_m)}{NOx_{in} \cdot \eta - NOx'_{in} \cdot \eta'}$$

$$NH_3^{out} = \frac{NOx'_{in} \cdot \eta' \cdot (NOx_{in} - NOx_m) - NOx_{in} \cdot \eta \cdot (NOx'_{in} - NOx'_m)}{NOx_{in} \cdot \eta - NOx'_{in} \cdot \eta}$$

Of course, the resulting $NH_3^{out}$ value permits direct calculation of the real NOx emission level (which corresponds to the NH$_3$ slip):

real $NOx = NOx_m - NH_3^{out}$.

Turning now to FIG. 1, there is represented a closed-loop SCR catalyst control structure in an exhaust line of an internal combustion engine that implements the above methodology and, as will be explained further below, uses the thus determined ammonia slip $NH_3^{out}$ and K values for determining whether a modification of the NH$_3$ reductant supply is required. It comprises: a SCR model 10, which models storage of NH$_3$ and NOx conversion efficiency; a urea reductant precursor command 12; a signal processor 14 to extract the K and $NH_3^{out}$ values; preferably a fuzzification unit 16 and a closed loop control 18.

The SCR model 10 has as input the engine out NOx flow ($NOx_{in}$) which corresponds to the NOx flow entering the SCR catalyst; the NOxin can be either determined by measurement using a NOx sensor located before the SCR and urea injector, or determined by means of a NOx model based on engine operating parameters taking into account e.g. injected fuel flow, engine load, EGR rate, ambient temperature. Further inputs to the SCR model 10 may typically comprise: exhaust flow, temperature, and/or NO$_2$ to NOx ratio.

The SCR catalyst further uses a NOx conversion efficiency model that calculates the NOx conversion efficiency based on a function of stored NH$_3$ in the SCR, the amount of injected urea and SCR temperature (and possibly more inputs).

The urea command 12 receives the information about stored NH$_3$ mass and converted NH$_3$ flow (accounting for lack of urea hydrolysis), as determined by the SCR model 10.

While the SCR model 10 and urea command 12 would permit alone operation of the SCR catalyst (i.e. in open-loop), an improved operating mode is achieved when a NOx sensor is provided at the SCR exit so that closed-loop control can be performed.

Accordingly, the NOx sensor signal ($NOx_m$) is processed in the signal processor 14, which is also fed with the SCR-in NOx flow ($NOx_{in}$) and the NOx convention efficiency ($\eta$).

The signal processor 14 then extracts the NOx conversion efficiency modeling error K and the ammonia slip (NH3out) as explained above. These K and NH3out values are then injected in a fuzzification module 16 and the corresponding fuzzy values processed in controller 18 where they are compared to a predetermined strategy. As it is clear to those skilled in the art, a regular Boolean control can be used instead of fuzzy logic (or the fuzzy logic controller may be calibrated to act as Boolean).

Indeed, an appreciable aspect of the present method is that it uses both the NOx and NH$_3$ components of the measured NOx value (NOx sensor reading) in the SCR control in order to always get the maximum performance of the system, i.e. best NOx conversion efficiency and no or low NH$_3$ slip.

The control logic in controller 18 derives from the assessment of possible deficiencies and their impact on ammonia slip and NOx conversion efficiency, as summarized in table 1.

TABLE 1

| | Effect on NOx conversion efficiency | Effect on NH$_3$ slip |
|---|---|---|
| Too low injection | Lower than expected | None |
| Too high injection | Higher than expected (or None) | High slip |
| Degraded catalyst efficiency | Lower than expected | High slip |
| Increased catalyst efficiency | Higher than expected | None |

Based on these possible failures, corrective actions are preferably taken according to table 2:

TABLE 2

| | K < 1 | K = 1 | K > 1 |
|---|---|---|---|
| $NH_3^{out} < NH_3^{TH}$ | Increase injection | No action | Increase $\eta$ modelling |
| $NH_3^{out} \geqq NH_3^{TH}$ | Decrease $\eta$ modelling | Decrease injection | Decrease injection |

This control logic is thus implemented in the controller 18. Corrective action are taken to modify the urea injection or modify the NOx conversion model depending on the ammonia slip level ($NH_3^{out}$), which is compared to an ammonia threshold ($NH_3^{TH}$) together with the modeling error factor K on the NOx conversion efficiency.

In case the urea injection is to be modified, the injection correction signal is combined with the uncorrected urea flow signal in operator 20 to build the final urea injection command signal.

The invention claimed is:

1. A method for controlling a selective catalytic reduction catalyst in an exhaust line of an internal combustion engine, wherein a supply of a quantity of a gaseous ammonia reductant to the SCR catalyst uses a closed-loop SCR catalyst model coupled to an SCR-out NOx sensor that measures an SCR-out NOx emission value, said closed-loop SCR catalyst model further including a NOx conversion efficiency model, characterized in that said closed-loop SCR catalyst model uses a relationship linking the measured SCR-out NOx emission value to the NOx conversion efficiency and an NH$_3$ emission value, wherein at least one of an actual NH$_3$ emission value and an actual SCR-out NOx indicative value are computed based upon differentiation of said relationship, and wherein a drift in the NOx conversion efficiency model and a variation of the $NH_3$ emission are considered to occur on a longer time scale than a variation of nitrous oxides entering and exiting the SCR catalyst,
wherein a modification of the supply of reductant depends on both the actual $NH_3$ emission value and the actual SCR-out NOx indicative value.

2. The method according to claim 1, wherein said actual SCR-out NOx indicative value is a NOx emission value or a NOx conversion efficiency or a modeling error of the NOx conversion efficiency.

3. The method according to claim 1, wherein an $NH_3$ emission value and/or an SCR-out NOx indicative value are computed based on the following relationship:

$$NOx_m = NOx_{in} \cdot (1-K\eta) + NH_3^{out}, \text{ where}$$

$NOx_m$ represents the measured SCR-out NOx emission value;
$NOx_{in}$ represents a determined NOx value entering the catalyst;
$\eta$ represents the predetermined NOx conversion efficiency;
K represents a modeling error factor on the NOx conversion efficiency model; and
$NH_3^{out}$ represents the $NH_3$ emission value at the exit of the SCR catalyst.

4. The method according to claim 1, wherein said computation is done based on two sets of values measured during a transient engine operating period.

5. The method according to claim 1, wherein said SCR catalyst model is based on one or more of: the total NOx flow entering the SCR catalyst, the SCR catalyst temperature, and the quantity of reducing agent stored in the catalyst.

6. A method for controlling an SCR catalyst having an actual NOx conversion efficiency using a SCR catalyst model having a predetermined NOx conversion efficiency for driving a supply of reductant, wherein said model has as inputs: an engine-out SCR nitrous oxides (NOx) emission value, an SCR catalyst temperature and a stored reductant value in the SCR catalyst; said method further using a NOx conversion efficiency model,
characterized in that a modification of the supply of reductant depends on both a measured reductant slip value and an actual drift of the NOx conversion efficiency model,
further comprising the step of adjusting the NOx conversion efficiency model based both on a relationship between the reductant slip value and a slip threshold and on a relationship between the actual NOx conversion efficiency and the predetermined NOx conversion efficiency.

7. The method according to claim 6, wherein the reductant supply is increased when the reductant slip value is below the slip threshold and the actual NOx conversion efficiency is lower than the predetermined NOx conversion efficiency.

8. The method according to claim 6, wherein the reductant supply is reduced when the reductant slip value is equal to or greater than the slip threshold and the actual NOx conversion efficiency is higher than the predetermined NOx conversion efficiency.

9. The method according to claim 6, wherein the reductant supply is decreased when the reductant slip value is equal to or greater than the slip threshold and the actual NOx conversion efficiency is substantially equal to the predetermined NOx conversion efficiency.

10. The method according to claim 6, wherein the NOx conversion efficiency model is globally reduced when the reductant slip value is equal to or greater than the slip threshold and the actual NOx conversion efficiency is lower than the predetermined NOx conversion efficiency.

11. The method according to claim 6, wherein the NOx conversion efficiency model is globally increased when the reductant slip value is lower than the slip threshold and the actual NOx conversion efficiency is greater than the predetermined NOx conversion efficiency.

12. The method according to claim 6, wherein said reductant is $NH_3$.

13. The method according to claim 6, wherein reductant slip and the actual NOx conversion efficiency are determined based on the method according to claim 1.

14. A method for controlling a selective catalytic reduction catalyst in an exhaust line of an internal combustion engine, wherein a supply of a quantity of a gaseous ammonia reductant to the SCR catalyst uses a closed-loop SCR catalyst model having a predetermined NOx conversion efficiency coupled to an SCR-out NOx sensor that measures an SCR-out NOx emission value, said closed-loop SCR catalyst model further including a NOx conversion efficiency model,
characterized in that said closed-loop SCR catalyst model uses a relationship linking the measured SCR-out NOx emission value to the NOx conversion efficiency and an $NH_3$ emission value,
wherein at least one of an actual $NH_3$ emission value and an actual SCR-out NOx indicative value are computed based upon differentiation of said relationship, and wherein a drift in the NOx conversion efficiency model and a variation of $NH_3$ emission are considered to occur on a longer time scale than a variation of nitrous oxides entering and exiting the SCR catalyst;
wherein said actual SCR-out NOx indicative value is a NOx emission value or a NOx conversion efficiency or a modeling error of the NOx conversion efficiency;
wherein an $NH_3$ emission value and/or an SCR-out NOx indicative value are computed based on the following relationship:

$$NOx_m = NOx_{in}(1-K\eta) + NH_3^{out}, \text{ where}$$

$NOx_m$ represents the measured SCR-out NOx emission value;
$NOx_{in}$ represents a determined NOx value entering the catalyst;
$\eta$ represents the predetermined NOx conversion efficiency;
K represents a modeling error factor on the NOx conversion efficiency model; and
$NH_3^{out}$ represents the $NH_3$ emission value at the exit of the SCR catalyst;
wherein said computation is done based on two sets of values measured during a transient engine operating period;
wherein said closed-loop SCR catalyst model is based on one or more of: a total NOx flow entering the SCR catalyst, an SCR catalyst temperature, and a quantity of reducing agent stored in the catalyst,
wherein a modification of the supply of reductant depends on both the actual $NH_3$ emission value and the actual SCR-out NOx indicative value.

15. A method for controlling an SCR catalyst having an actual NOx conversion efficiency using an SCR catalyst model having a predetermined NOx conversion efficiency for driving a supply of reductant, wherein said model has as inputs: an engine-out SCR nitrous oxides (NOx) emission value, an SCR catalyst temperature and a stored reductant value in the SCR catalyst; said method further using a NOx conversion efficiency model,
characterized in that a modification of the supply in reductant depends on both a measured reductant slip value and an actual drift of the NOx conversion efficiency model;

wherein the reductant supply is increased when the reductant slip value is below a slip threshold and the actual NOx conversion efficiency is lower than the predetermined NOx conversion efficiency;

wherein the reductant supply is reduced when the reductant slip value is equal or greater than a slip threshold and the actual NOx conversion efficiency is higher than the predetermined NOx conversion efficiency;

wherein the reductant supply is decreased when the reductant slip value is equal to or greater than a slip threshold and the actual NOx conversion efficiency is substantially equal to the predetermined NOx conversion efficiency;

wherein the NOx conversion efficiency model is globally reduced when the reductant slip value is equal or greater than the slip threshold and the actual NOx conversion efficiency is lower than the predetermined NOx conversion efficiency;

wherein the NOx conversion efficiency model is globally increased when the reductant slip value is lower than the slip threshold and the actual NOx conversion efficiency is greater than the predetermined NOx conversion efficiency; wherein said reductant is $NH_3$;

wherein $NH_3$ slip and the actual NOx conversion efficiency are determined based on the method according to claim 1.

* * * * *